(12) United States Patent
Boedihardjo et al.

(10) Patent No.: US 11,699,108 B2
(45) Date of Patent: Jul. 11, 2023

(54) TECHNIQUES FOR DERIVING AND/OR LEVERAGING APPLICATION-CENTRIC MODEL METRIC

(71) Applicant: MAXAR MISSION SOLUTIONS INC., Westminster, CO (US)

(72) Inventors: Arnold Boedihardjo, Westminster, CO (US); Adam Estrada, Westminster, CO (US); Andrew Jenkins, Westminster, VA (US); Nathan Clement, Westminster, CO (US); Alan Schoen, Westminster, CO (US)

(73) Assignee: MAXAR MISSION SOLUTIONS INC., Westminster, CO (US)

( * ) Notice: Subject to any disclaimer, the term of this patent is extended or adjusted under 35 U.S.C. 154(b) by 296 days.

(21) Appl. No.: 16/887,670

(22) Filed: May 29, 2020

(65) Prior Publication Data
US 2020/0380307 A1 Dec. 3, 2020

Related U.S. Application Data

(60) Provisional application No. 62/855,138, filed on May 31, 2019.

(51) Int. Cl.
*G06N 20/20* (2019.01)
*G06N 20/00* (2019.01)
(Continued)

(52) U.S. Cl.
CPC .......... *G06N 20/20* (2019.01); *G06F 18/214* (2023.01); *G06F 18/217* (2023.01); *G06N 5/04* (2013.01);
(Continued)

(58) Field of Classification Search
CPC .......................... G06K 9/6262; G06V 10/776
See application file for complete search history.

(56) References Cited

U.S. PATENT DOCUMENTS

| | | | |
|---|---|---|---|
| 10,410,090 B1 * | 9/2019 | Wilczynski | G06V 10/776 |
| 11,423,259 B1 * | 8/2022 | Pratusevich | G06K 9/6262 |

(Continued)

OTHER PUBLICATIONS

U.S. Appl. No. 16/887,705, filed May 29, 2020; Boedihardjo et al.
(Continued)

*Primary Examiner* — Wen W Huang
(74) *Attorney, Agent, or Firm* — Nixon & Vanderhye PC

(57) ABSTRACT

Techniques for quantifying accuracy of a prediction model that has been trained on a data set parameterized by multiple features are provided. The model performs in accordance with a theoretical performance manifold over an intractable input space in connection with the features. A determination is made as to which of the features are strongly correlated with performance of the model. Based on the features determined to be strongly correlated with performance of the model, parameterized sub-models are created such that, in aggregate, they approximate the intractable input space. Prototype exemplars are generated for each of the created sub-models, with the prototype exemplars for each created sub-model being objects to which the model can be applied to result in a match with the respective sub-model. The accuracy of the model is quantified using the generated prototype exemplars. A recommendation engine is provided for when there are particular areas of interest.

35 Claims, 8 Drawing Sheets

(51) Int. Cl.
*G06N 5/04* (2023.01)
*G06F 18/21* (2023.01)
*G06F 18/214* (2023.01)
*G06V 10/75* (2022.01)
*G06V 10/764* (2022.01)
*G06V 10/77* (2022.01)
*G06V 40/16* (2022.01)

(52) U.S. Cl.
CPC ............ *G06N 20/00* (2019.01); *G06V 10/76* (2022.01); *G06V 10/764* (2022.01); *G06V 10/7715* (2022.01); *G06V 40/172* (2022.01)

(56) References Cited

U.S. PATENT DOCUMENTS

| | | | |
|---|---|---|---|
| 2015/0039540 A1* | 2/2015 | Dong | ............ G06N 5/04 706/12 |
| 2019/0095756 A1 | 3/2019 | Agrawal | |
| 2019/0325342 A1* | 10/2019 | Sikka | ............... G06V 30/19173 |
| 2020/0117765 A1* | 4/2020 | Sengupta | ................ G06F 30/20 |
| 2020/0126207 A1* | 4/2020 | Saltz | ....................... G06K 9/628 |
| 2021/0133495 A1* | 5/2021 | Inoshita | ................ G06N 20/00 |

OTHER PUBLICATIONS

Wikipedia—NIIRS, retrieved May 29, 2020, 1 page. https://en.wikipedia.org/wiki/NIIRS.

L.A. Maver et al., "National Image Interpretability Rating Scales," FAS Intelligence Resource Program, retrieved May 29, 2020, 10 pages. https://fas.org/irp/imint/niirs.htm.

Mohamed Ahmed Ali et al., "Estimation of NIIRS, for High Resolution Satellite Images, Using the Simplified GIQE," International Journal of Innovative Research in Computer and Communication Engineering, vol. 4, Issue 5, May 2016, 6 pages. http://www.ijircce.com/upload/2016/may/47_Estimation.pdf.

* cited by examiner

TECHNIQUES FOR DERIVING AND/OR LEVERAGING APPLICATION-CENTRIC MODEL METRIC

CROSS-REFERENCE TO RELATED APPLICATION

This application claims priority to U.S. Application Ser. No. 62/855,138 filed on May 31, 2019, the entire contents of which are hereby incorporated herein by reference.

TECHNICAL FIELD

Certain example embodiments described herein relate to techniques usable in connection with models supporting machine learning (ML) and/or artificial intelligence (AI) applications. More particularly, certain example embodiments described herein relate to techniques for deriving and/or leveraging an application-centric model metric in connection with a model that supports ML and/or A functionality.

BACKGROUND AND SUMMARY

Artificial intelligence (AI) in general refers to intelligence demonstrated by machines rather than humans and in this sense describes machines that mimic "cognitive" functions (such as, for example such as "learning" and "problem solving") that humans typically associate with other human minds. Areas of A research typically include reasoning, knowledge representation, planning, learning, natural language processing, perception, and the ability to move and manipulate objects, etc. In this sense, machine learning (ML) may be thought of as being a subset of AI, as ML in general may be thought of as the scientific study of algorithms and statistical models that computer systems use to help perform specific tasks effectively without using explicit instructions, instead relying on, for example, patterns and inferences.

AI problems oftentimes are addressed using search and optimization tools, logic programming and automated reasoning, probabilistic approaches to uncertain reasoning (using, for example, Bayesian networks, Hidden Markov Models, etc.), classifiers and statistical learning methods, neural networks, etc. Models oftentimes underlie these and/or other AI-related techniques. For instance, ML algorithms quite often build a mathematical model based on training data. Once trained, a model can be used to make predictions or decisions without being explicitly programmed to perform the task.

Far from being relegated to topics of science fiction, AI and ML techniques are being actively researched and are already implemented in many facets of everyday life, affecting millions of people around the world. Indeed, AI and ML technologies already have practical applications in computer visioning, ecommerce and other recommendation engines, financial market analysis, fraud detection, game playing, image recognition, medical diagnosis, natural language processing, search engines, speech recognition, weather prediction, and many other areas.

There is a perception that models trained for a particular application will be good at dealing with issues associated with that application. For instance, an AI model trained to play chess will be good at playing chess. Yet most people would not realistically expect that AI model to be good at poker (even though chess and poker are both games). Nor would most people realistically expect the AI model trained to play chess to be good at detecting credit card fraud or predicting whether a storm will affect a particular geographic region.

Although these are somewhat apparent limits to trained models, other limitations may be imposed by the training data used. These limitations may be intentionally or unintentionally introduced, and they may or may not be apparent. For example, there is evidence that Microsoft's experiment with "Tay," an AI chat bot on Twitter, was intentionally manipulated by a group of people to create a racist AI "personality." As another example, an MIT Media Lab researcher found that facial recognition algorithms created by Microsoft, IBM, and Face++ could identify a white man with near-perfect precision, but had significant problems with a darker-skinned woman.

These issues might seem extreme to some, but they underscore problems that might arise in connection with models that are presumed to be quite accurate—and these problems might be not even be known or appreciated by people who rely on output from those models. In other words, a presumed "neutral" model may in essence be trained to have a "bias," making it function better or worse for a given problem in a given space based on, for example, assumptions made during training, the training methodology or data set used, and/or the like.

Certain example embodiments address these and/or other concerns.

For instance, one aspect of certain example embodiments relates to quantifying the accuracy of a given model for a general input space. In other words, one aspect of certain example embodiments relates to techniques that provide the ability to make quantifiable, reliable, and reproducible statements about the quality of a given model.

Another aspect of certain example embodiments relates to the ability to quantify the accuracy of models so that they can be rated and/or compared to one another using a common and understandable metric.

Another aspect of certain example embodiments relates to the ability to perform the above with respect to specific input spaces or areas of interest. For example, certain example embodiments are able to suggest a particular model or training data set of interest for a specific input space or area of interest.

In certain example embodiments, a method of quantifying accuracy of a prediction model that has been trained on a data set parameterized by a plurality of features is provided. The model performs in accordance with a theoretical performance manifold over an intractable input space in connection with the features. A determination is made as to which of the plurality of features are strongly correlated with performance of the model. Based on the features determined to be strongly correlated with performance of the model, a plurality of parameterized sub-models are created such that, in aggregate, they approximate the intractable input space. Prototype exemplars are generated for each of the created sub-models, with the prototype exemplars for each created sub-model being objects to which the model can be applied to result in a match with the respective sub-model. The accuracy of the model is quantified using the generated prototype exemplars.

In certain example embodiments, a method of recommending a prediction model from among a plurality of different prediction models is provided. Each one of the different prediction models has been trained based on a respective training data set, and each one of the different prediction models performs in accordance with a respective theoretical performance manifold. An indication of a region definable in relation to the theoretical performance manifolds of the different prediction models is received as input. For each of the different prediction models, the indication of the region is linked to features parameterizing the respective performance manifold. One or more portions of the respective performance manifold is/are identified based on the features determined by the linking, with the one or more portions having a volume and a shape that collectively denote an expected performance of the respective model for the input. The expected performance of the different prediction models are compared for the input. Based on the comparison, one or more of the different prediction models is/are recommended.

In addition to the features described in the previous paragraphs and in the detailed description below, counterpart systems, computing platforms, non-transitory computer readable storage media tangibly storing instructions for performing such methods, executable computer programs, and the like, are contemplated herein, as well.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
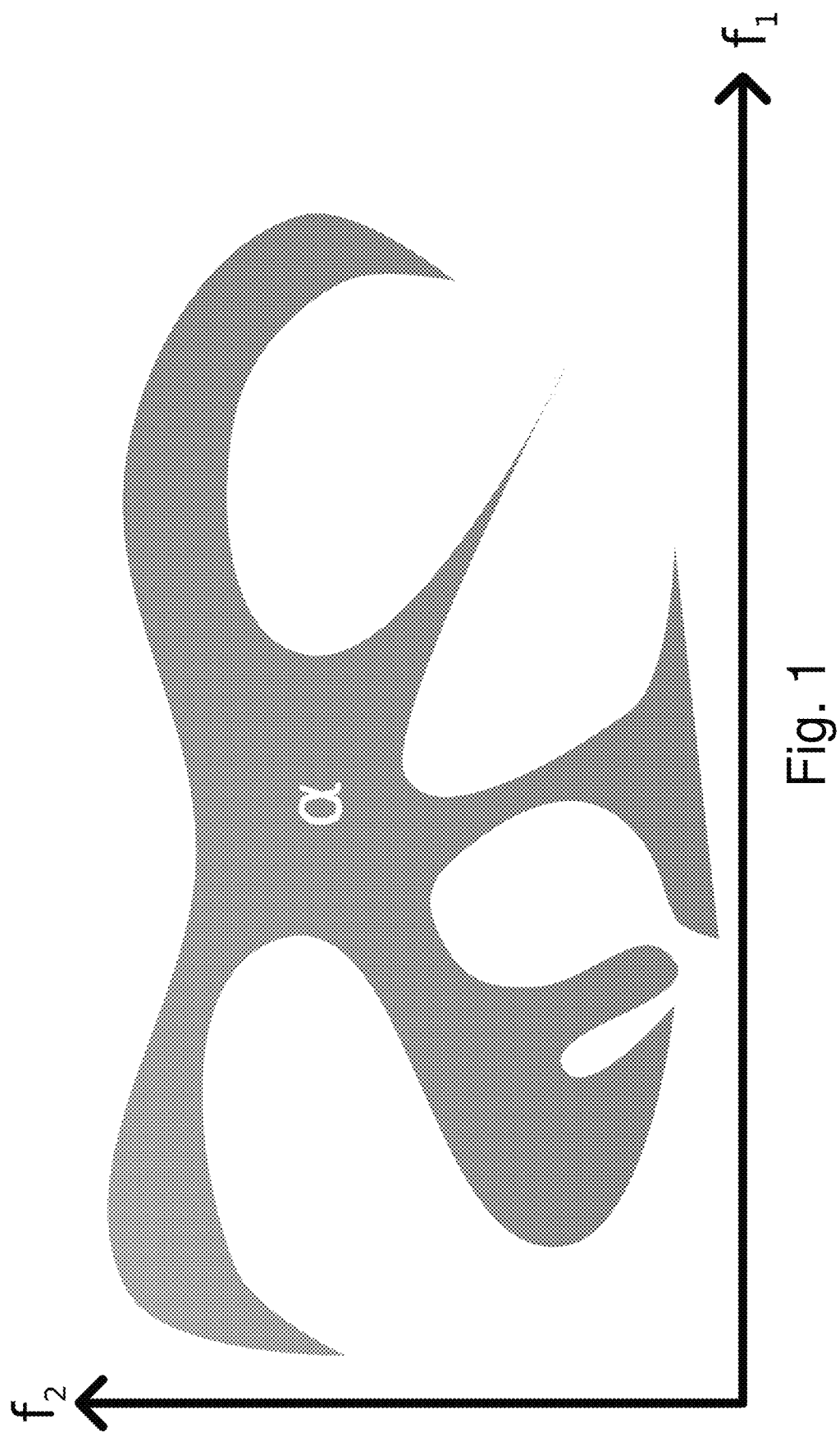
FIG. 1 is an example performance manifold defined on the set of all valid image collections to which a hypothetical model M can be applied.

Certain example embodiments described herein relate to techniques for deriving and/or leveraging an application-centric model metric in connection with a model that supports machine learning (ML) and/or artificial intelligence (AI) functionality. That is, certain example embodiments develop and implement an index rating system for quantifying the accuracy of detection and/or other models. Such models can be used in a variety of applications including, for example, identifying objects in satellite imageries, facial recognition, etc. A model in this sense is a learning algorithm that has been trained on a data set parameterized by a plurality of features. In the satellite imagery context, for example, the data set may be parameterized by spatial extent, National Imagery Interpretability Rating Scale (NIIRS), off-nadir angle, cloud coverage, and other attributes. Thus, in the context of this satellite imagery example, features may include spatial extent, NIIRS, off-nadir angle, cloud coverage, and other attributes. The rating index of certain example embodiments helps measure the expected performance of that model on new and/or unseen imageries, i.e., imageries on which the model has not been trained. As such, the rating index of certain example embodiments considers the large and potentially intractable class of all possible unseen imagery inputs.

As will be appreciated from the more detailed description below, certain example embodiments generate a compact and accurate approximate representation of the input space, produce prototypical exemplars from the approximate representation, and efficiently evaluate the accuracy of the model for the set of exemplars to estimate a given model's expected performance. The expected performance in this sense is a statistical measure of the model's accuracy in the "general case." However, because a user's particular interest may markedly differ from the general case, a recommender system based implementation may be provided for use in connection with this index rating. That is, although the expected performance metric may represent the model's accuracy across the entire spectrum of available inputs (the "general case" alluded to above), some users may be concerned with only limited input spaces (a subset of the general case). In the geospatial context, a limited input space (a subset of the general case) might involve, for example, locating objects in a desert where coloration and topography might be relatively uniform, in a cityscape where off-nadir images may predominate, etc. Of course, in this context, coloration and topography might be relatively uniform within desert and snow images respectively, but coloration and topography may different between the two.

From a data science perspective, the inventors have observed that a detection model M can be thought of as being trained on object class type T and an image collection S. A set of features $F=\{f_1 \ldots f_k\}$ parameterizes the training regime of model M. For example, feature f may represent cloud coverage, NIIRS, off-nadir angle, etc., as noted in the above-mentioned satellite imagery example. Thus, the performance of model M is defined by its model architecture and F, i.e., M(F). $G_{1 \ldots n}(M,P)$ is the set of performance metrics for model M and an arbitrary image collection P. For a given performance metric $G_i$, the determination of the rating metric in certain example embodiments involves estimating the expected performance of model M for detecting object T from a novel (unseen) image collection S' or $E[G_i(M,S')]$, and the variation in the performance metrics of the model on the novel (unseen) image collection S' or $VAR[G_i(M,S')]$.

This technique may be used on a number of different model types. This includes, for example, convolutional neural networks (CNNs), naïve Bayesian networks (NBNs), decision trees, etc. Typical performance metrics may include mean average precision, receiver operating characteristic (ROC) related curves (such as precision-recall ROC or P-ROC), an F-beta score (e.g., F1), single scatter, latent feature measures from item-response theory (IRT), and/or the like. It therefore will be appreciated that the techniques described herein may be used in connection with a variety of different possible performance metrics for a plurality of different possible model types, with the same or different performance metric(s) being applicable to the same or different models in different instances.

Constraints are introduced, including on the novel (unseen) image collection S', in order to enable computations related to $E[G_i(M,S')]$ and $VAR[G_i(M,S')]$. For example, training inputs are modeled so as to be constrained to $argmin_{S'}$ (DISCREPANCY (S', U)) where U may represent training data S, or the set of all valid image collections to which the model M can be applied, $\alpha$. Here, $argmin_{S'}$ refers to the ML model assumption that the actual data is similar to a given collection of data (e.g., training data S), with some small discrepancy, and DISCREPANCY can be measured in different ways to in essence query how well S' matches the input data set. For instance, DISCREPANCY can be symmetric KL-divergence on probability distributions P(S), P(S'), P($\alpha$), where $\alpha$ is the set of all valid image collections to which the model M can be applied. It will be appreciated that inverse SIMILARITY can be used in place of DISCREPANCY in certain example embodiments. These and/or other constraints may be introduced in different example instances, e.g., based on domain knowledge, specific applications or use cases, etc.

Figure 2:
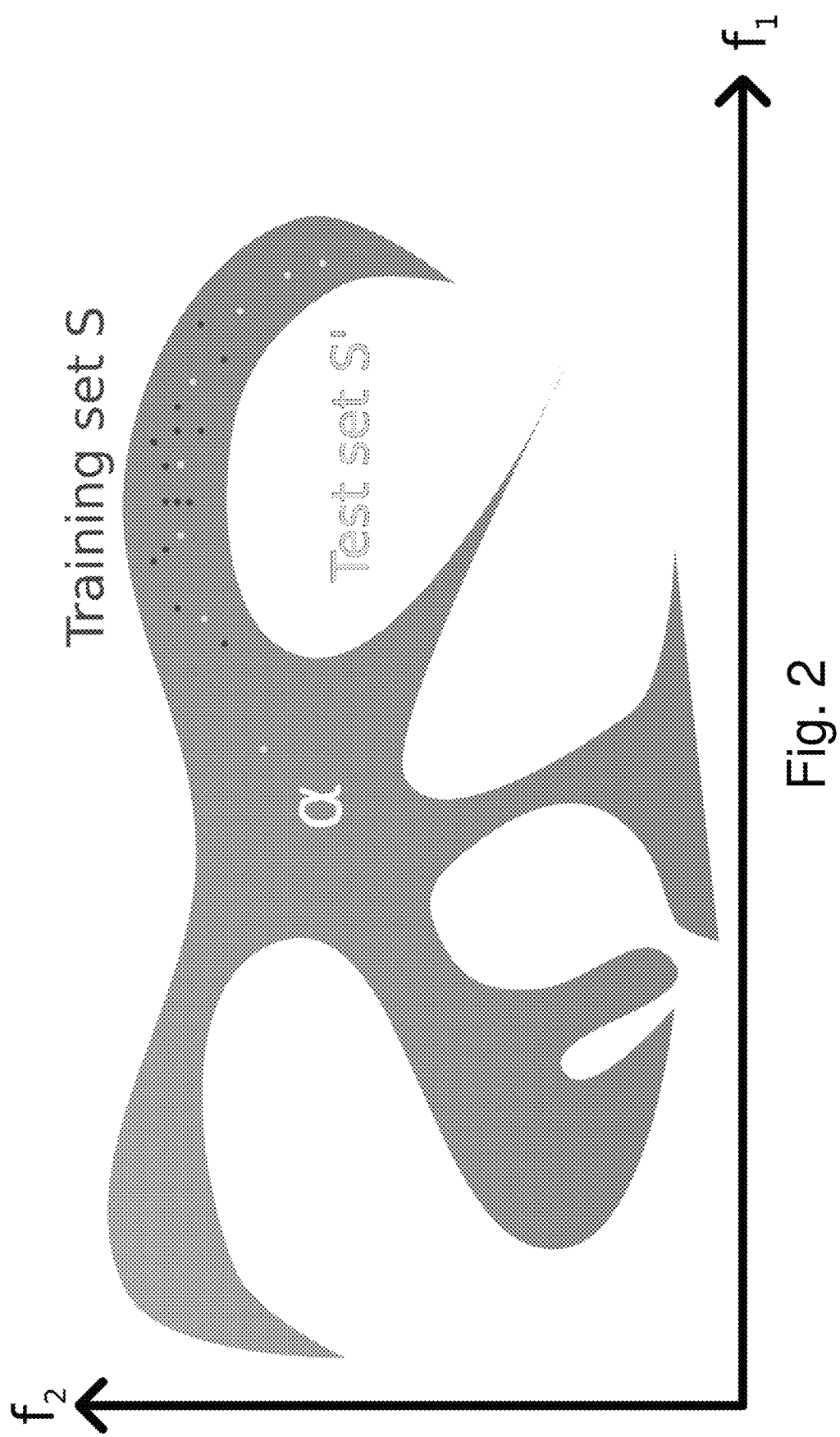
FIG. 2 shows a subspace of the performance manifold from FIG. 1, with the training set S and the test set S'.

Models perform in accordance with a theoretical performance manifold. FIG. 1 is an example performance manifold defined on the set of all valid image collections to which the model M can be applied. The model M is parameterized by features. In FIG. 1, features f1 and f2 are shown, and additional features are implied by the color gradient. The surface area of subspace projections (coverage) of the performance manifold is normalized against the volume (G) of S' in the performance manifold. In this regard, FIG. 2 shows a subspace of the performance manifold from FIG. 1, with the training set S and the test set S'. The subspace thus implies an additional constraint on the model training inputs.

Valid inputs are modeled so as to be constrained to $argmin_{S'}$ (DISCREPANCY (S',$\alpha$)). As above, the discrepancy can be measured in different ways, inverse SIMILARITY can be used in place of DISCREPANCY, etc.

Each of these constraint scenarios involves the determination of S' against a complex and potentially infinite input set. Other challenges relate to the fact that $\alpha$ is in general intractable and/or extremely large, and that there are high computational requirements for calculating the performance metrics $G_i(M,.)$, i.e., metrics of the model M on S' and/or different conditions placed on S' (such as, for example, $\alpha$).

As noted above, certain example embodiments generate a compact and accurate approximate representation of the input space, produce prototypical exemplars from the approximate representation, and efficiently evaluate the accuracy of the model for the set of exemplars to estimate the model's expected performance. Using the definitions and "problem setup" discussed above, then, certain example embodiments create a tractable model of $\alpha$, generate S' from proxy of $\alpha$, and estimate $E[G_i(M,S')]$ and $VAR[G_i(M,S')]$. The creation of the tractable model of $\alpha$ involves developing a proxy for $\alpha$ to which computation of $G_i(\ )$ can be applied. This is possible because the proxy for $\alpha$ is tractable (e.g., as enabled by pruning). The generation of S' from the proxy of $\alpha$ involves creating and/or deriving prototype exemplars of S' from the proxy of $\alpha$. And the estimation of $E[G_i(M,S')]$ and $VAR[G_i(M,S')]$ involves computing $G_i(\ )$ based on the prototypes of S' and estimating the probabilities of the exemplars. These operations will be discussed, in turn, below.

When it comes to creating a tractable model of $\alpha$, the data image features F that are strongly correlated to the model M's performance are determined. There are a number of different ways that F can be determined. For example, F can be defined a priori to include features known or suspected to be of interest. In the geospatial image context, for example, cloud cover, NIIRS, and/or other factors may be specified by a user a priori. In general, domain experience may be taken into account in identifying features. As another example, F can be defined using embedding projections such as feature extractors. Feature extractors based on a residual network algorithm (e.g., ResNet50) may be used in this regard.

Figure 3:
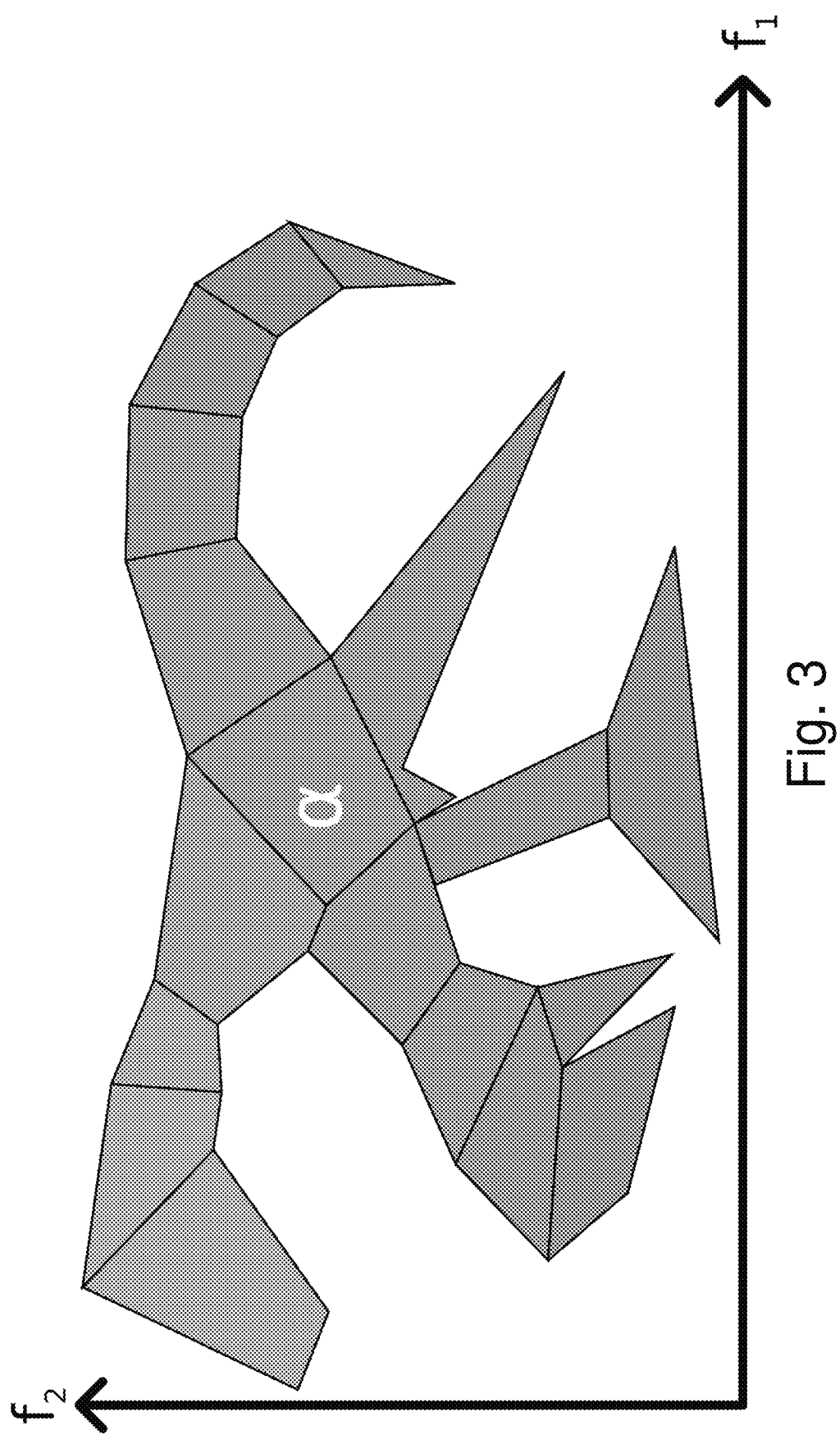
FIG. 3 shows how the performance manifold shown in FIG. 1 can be tessellated so that the aggregate of the tessellation approximates the performance manifold from FIG. 1.

Based on F, a piecewise aggregate model is created. This piecewise aggregate model in essence partitions $\alpha$ into "simplified" parameterized subsets or sub-models. FIG. 3, for example, shows how the performance manifold shown in FIG. 1 can be tessellated so that the aggregate of the tessellation approximates the performance manifold from FIG. 1. Different approaches may be used to create the sub-models in different example embodiments. Example approaches may include a priori creation of sub-models, data-driven sub-model creation, hybrid approaches that use a priori creation of sub-models and data-driven sub-model creation, etc. Further details regarding some example approaches are provided below.

First, as indicated above, a data-driven sub-model creation approach may be used in certain example embodiments. In this regard, a data-driven sub-model creation approach may involve deriving sub-models through clustering or the like. For instance, a similar metric on F and G( ) can be generated and used as input to a clustering algorithm. This may be performed on any images that may be represented by the manifold including, for example, training and test samples, in certain example embodiments.

Second, a priori creation of sub-model may be facilitated by developing or leveraging an existing taxonomy of image classes in certain example embodiments. In the geospatial context, for example, a taxonomy may specify images with cloud cover of 0-10%, 11-20%, etc. Such taxonomies may be "flat" or multi-level hierarchies indifferent example embodiments. Data analytics can be used to develop clusters of images that should be grouped together in certain example embodiments, a priori, similar to the approach set forth in the preceding paragraph.

In general, it may be desirable to have each sub-model or partition converge to some uniform distribution of values. The value that each sub-model or partition converges to may be one or more performance metrics G( ), for example. This may help to determine areas where the model performs uniformly. It will be appreciated that this strict assumption may be loosened in certain example embodiments (e.g., in response to a determination that there are too many partitions, the partitions created are too small, clusters are too close together, etc.).

With respect to generating S' from the proxy of $\alpha$, prototype exemplars are generated for each sub-model from above. This in essence helps to create a sufficient sample size for each partition so that a check can be performed as to how well the partitions are formed. Synthetics may be used to generate foreground or background images, for instance. This approach differs from typical uses of synthetics. That is, synthetics typically are used to determine training data in a manner that is careful to avoid creating artifacts that could hamper performance of the model (e.g., creating too many shadows in an image). Here, however, synthetics can be used for testing the model (or at least parts thereof), and the creation of artifacts might not be problematic. To the contrary, such artifacts might or might not actually be relevant to the tested part of the model. Thus, certain example embodiments may involve determining what features matter to a given part, and/or the whole, of the model (a form of sensitivity testing with respect to, or perturbation of, individual features) in generating synthetic images. It will be appreciated that the exemplar is not limited to a particular instance of an image or collection of images (real or otherwise) but instead can be objects parameterized explicitly on F. This may allow for estimates of G( ) based on F, explicitly.

If there exists a sufficient set of (prototype) proxy exemplars of α within a predefined neighborhood of S' (suggesting that the prototype exemplars are representative of the intractable input space), then it follows that estimates on the expected performance of the exemplars from S' will approximate the expected performance of the model M. In this regard, it can be assumed that:

$E[G_i(M,S')] \approx \Sigma G_i(M,q)*P(q)$, where q is a proxy exemplar and P(q) is the probability of sub-model represented by the exemplar $VAR[G_i(M,S')] \approx [\Sigma G_i(M,q)\hat{}2*P(q)] - [\Sigma G_i(M,q)*P(q)]\hat{}2$ Etc.

On the other hand, if no sufficient proxy exemplars exist within the predefined neighborhood of S' (suggesting that the prototype exemplars are not representative of the intractable input space and/or that the prototype exemplars are completely parameterized by the features), the proxy exemplars are to be estimated. In this case, a regression is created for G on the set of exemplars q. The formulae above will apply here as well, except that $G=R_M(q)$. Regression may be advantageous in that it becomes possible to interpolate and/or extrapolate performance once sufficient data is obtained. This in turn enables the performance manifold to be calculated directly.

In some scenarios, it may be possible to attain a tight lower bound on $E[G_i(M,S')]$ and $VAR[G_i(M,S')]$. Deriving new and accurate exemplars within the small hyperball may be a much less challenging task than deriving exemplars at an arbitrary point within the proxy of α. That is, for an arbitrary image i, it typically will be easier to generate synthetics or obtain real images that are extremely similar to i. A small hyperball may be superimposed for each q. The performance metrics G( ) may be computed using exemplars inside the ball, and VAR( ) can be computed as well. The MAX of VAR( ) from all hyperballs can be considered and may in some instances serve as an empirical lower bound on the variance component of the metric, a mean component, etc.

Figure 4:
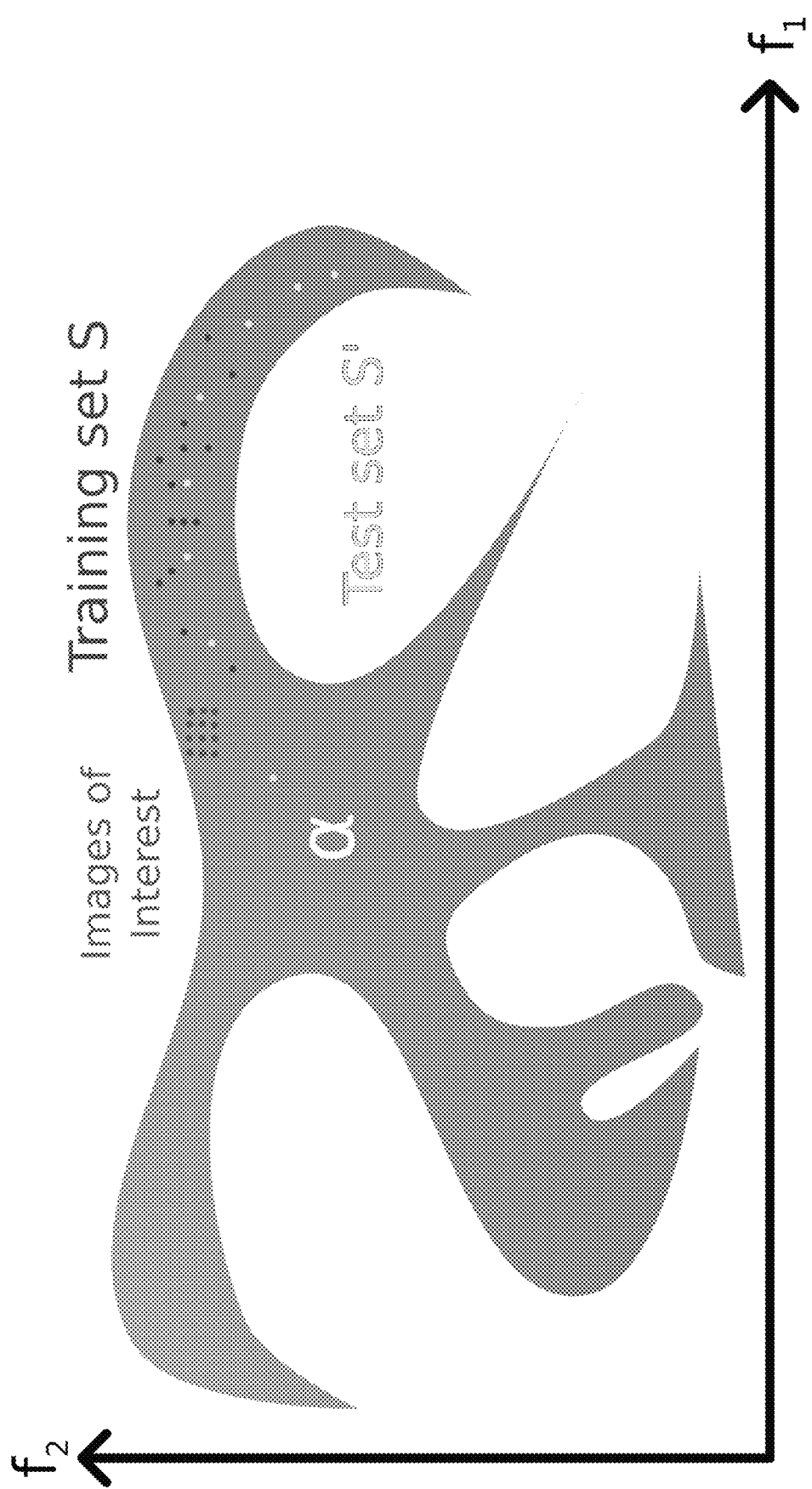
FIG. 4 shows the performance manifold of FIG. 1, with images of interest confined to a relatively tight area remote from the training set S and the test set S'.

As noted above, a user might have a limited area of interest. FIG. 4, for example, shows the performance manifold of FIG. 1, with images of interest confined to a relatively tight area remote from the training set S and the test set S'. Because the model M's performance for a user's area of interest can deviate significantly from $E[G_i(M,S')]$, a recommender system may be employed. In certain example embodiments, instead of computing the performance metric for S', the performance metric is computed based on the user's area of interest, U c S', where U is small (and in some cases potentially extremely small) subset of S'. This will allow differentiated scoring of models based on user's unique needs in certain example embodiments. In certain example embodiments, a user may specify features of interest directly, the system may infer features of interest (e.g., by analyzing example images and deriving those features, etc.), and/or the like.

For example, if a user is interested in models X and Y as they apply to a desert region, then the recommender system will output scores based on the desert region. However, if that user is interested in those models as they apply to a snow region, then the system will (re)compute scores based on snow terrain. Relative performance of X and Y may be different for desert and snow, e.g., X may outperform Y in the desert but not in snow. Thus, the recommender system may help the user determine which models are best for a given interest or set of interests.

Figure 5:
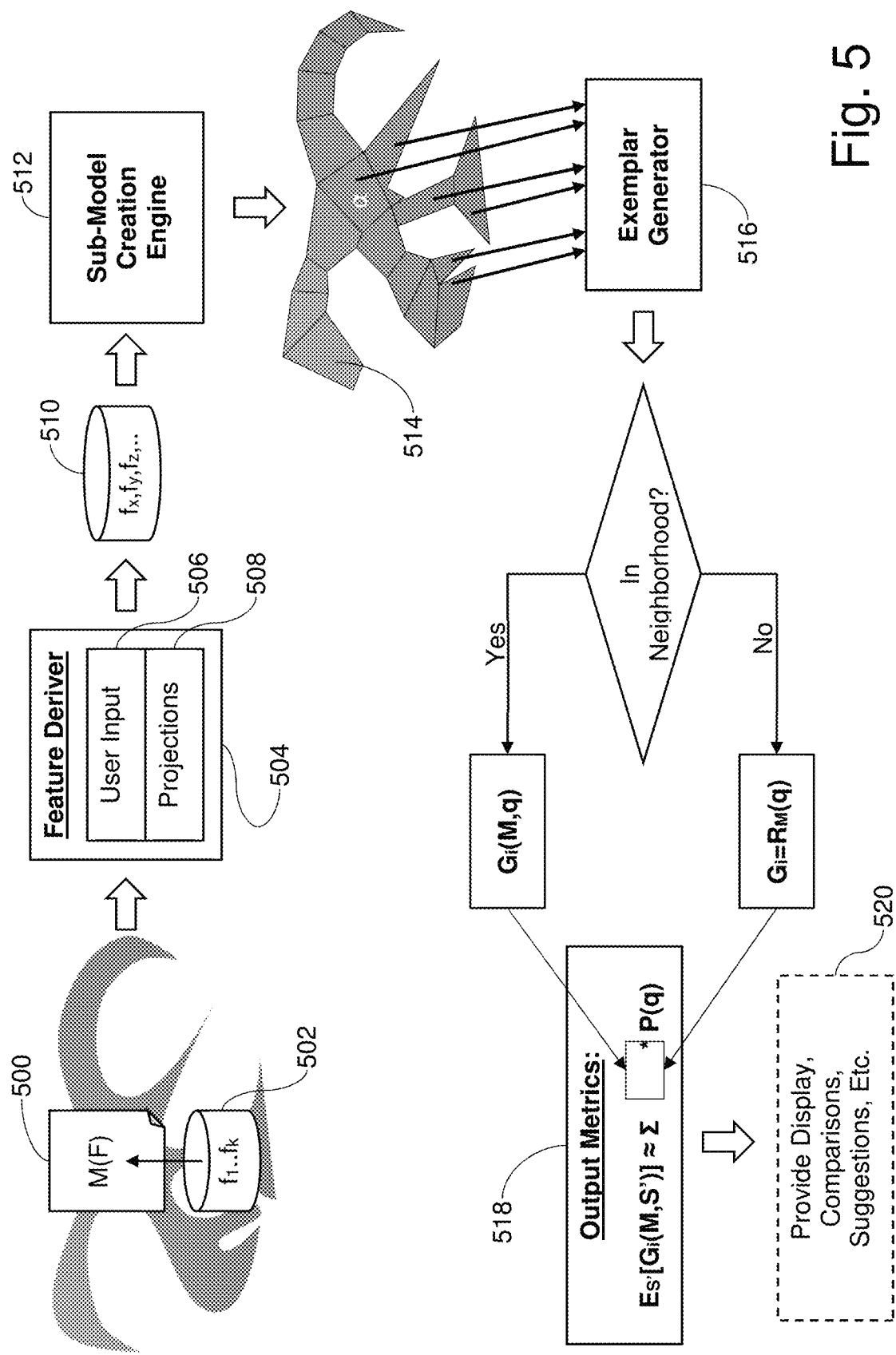
FIG. 5 is a block diagram showing, at a notional level, example components for quantifying accuracy of a prediction model, in accordance with certain example embodiments.
Figure 6:
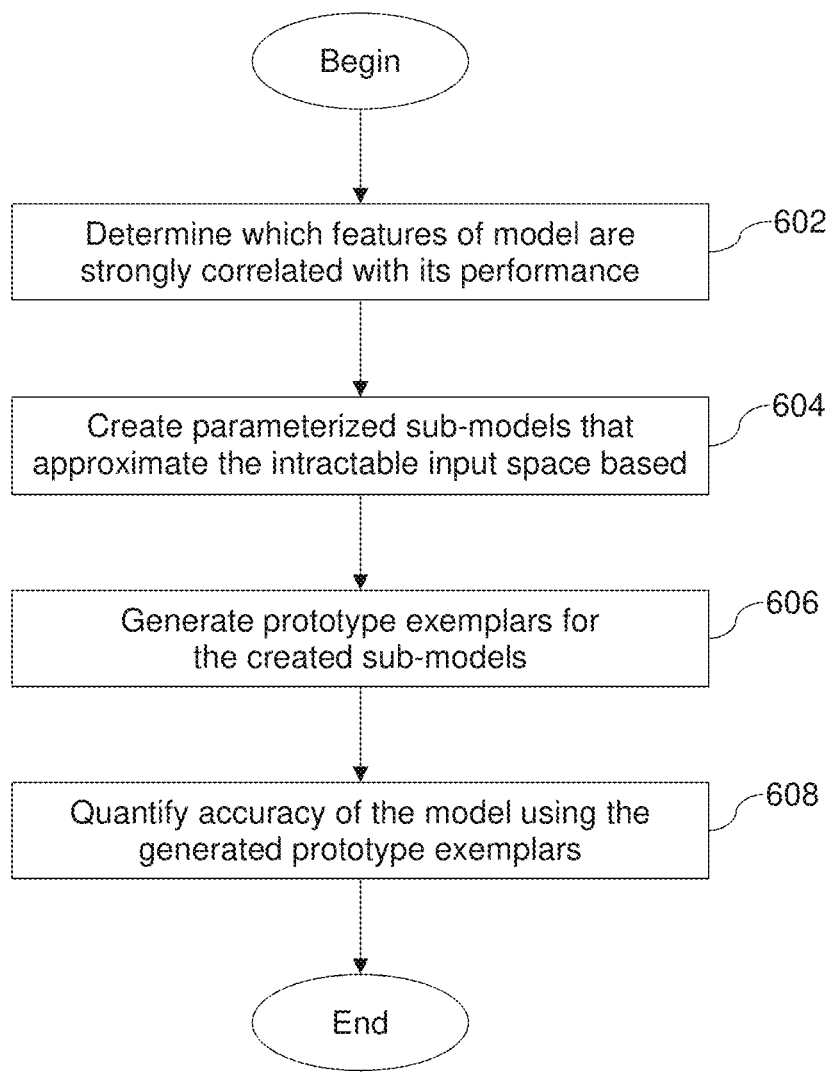
FIG. 6 is a flowchart showing an approach for quantifying accuracy of a prediction model, in accordance with the approach shown in and described in connection with FIG. 5.

FIG. 5 is a block diagram showing, at a notional level, example components for quantifying accuracy of a prediction model, in accordance with certain example embodiments, and FIG. 6 is a flowchart showing an approach for quantifying accuracy of a prediction model, in accordance with the approach shown in and described in connection with FIG. 5. As shown in FIG. 5, the model 500 is parameterized by features 502. The model 500 performs in accordance with a theoretical performance manifold over an intractable input space (e.g., all valid data sets to which the model can be applied) in connection with those features 502. The model 500 may, for example, be trained to identify objects in images (e.g., with the images being satellite images or the like), and the features 502 may include, for example, spatial extent, National Imagery Interpretability Rating Scale (NIIRS), off-nadir angle, signal-to-noise ratio (SNR), cloud coverage, and/or other values. The objects themselves may be images and/or image collections, with the objects potentially being parameterized explicitly on the features. In some instances, the intractable input space may be limited to a continuous region defined by the data set on which the prediction model is trained, a plurality of discontinuous regions, and/or the like.

The feature deriver module 504 determines which of the features 502 are strongly correlated with performance of the model 500. This may be aided based on user input 506 and/or embedding projections 508 (step 602 in FIG. 6). In some cases, at least one of the features 510 determined to be strongly correlated with part of the model 500 may include a non-linear mapping based on a feature from the data set on which the prediction model is trained. For instance, the non-linear mapping may be kernel principal component analysis.

The feature deriver module 504 outputs those features 510, and based on the features 510 determined to be strongly correlated with performance of the model 500, the sub-model creation engine 512 creates parameterized sub-models that, in an aggregate tessellation 514, approximate the intractable input space (step 604 in FIG. 6). The exemplar generator 516 generates prototype exemplars for each of the created sub-models in the aggregate tessellation 514, with the prototype exemplars for each created sub-model being objects to which the model 500 can be applied to result in a match with the respective sub-model (step 606 in FIG. 6).

A determination is made as to whether the exemplars are representative of the intractable input space. If so, then the performance metrics for the exemplars are used in connection with output metrics 518. If not, then a regression or the like is run and the results thereof are used in connection with output metrics 518. In other words, the accuracy of the model 500 is quantified using the generated prototype exemplars in one form or another. The quantified accuracy may, for example, reflect the expected performance of the model identifying an object of a given type from new and/or unseen images. Those output metrics may be output for display (e.g., as being a rating on a common rating scale representing accuracy of the model 500), provided for comparison purposes (e.g., with other models), used to power suggestions (e.g., as to whether this model is good or bad for a particular task), etc. (see step 608 in FIG. 6).

In certain example embodiments, the data set on which the prediction model is trained may be for a first application, the accuracy of the model may be quantified for a data set for a second application, and the first and second applications may be different from one another. In some instances, the data set on which the prediction model is trained may be for a first geospatial and/or geotemporal image type, the accuracy of the model may be quantified for a data set for a second geospatial and/or geotemporal image type, and the first and second geospatial and/or geotemporal image types may be different from one another.

It will be appreciated that the modules, engines, generators, etc., shown in and described in connection with FIG. 5 may be implemented in connection with processing resources including at least one processor and a memory. For example, program logic corresponding to these elements may be executed by the processing resources. The output may be displayed on a display device, transmitted to a remote computing device, etc.

Figure 7:
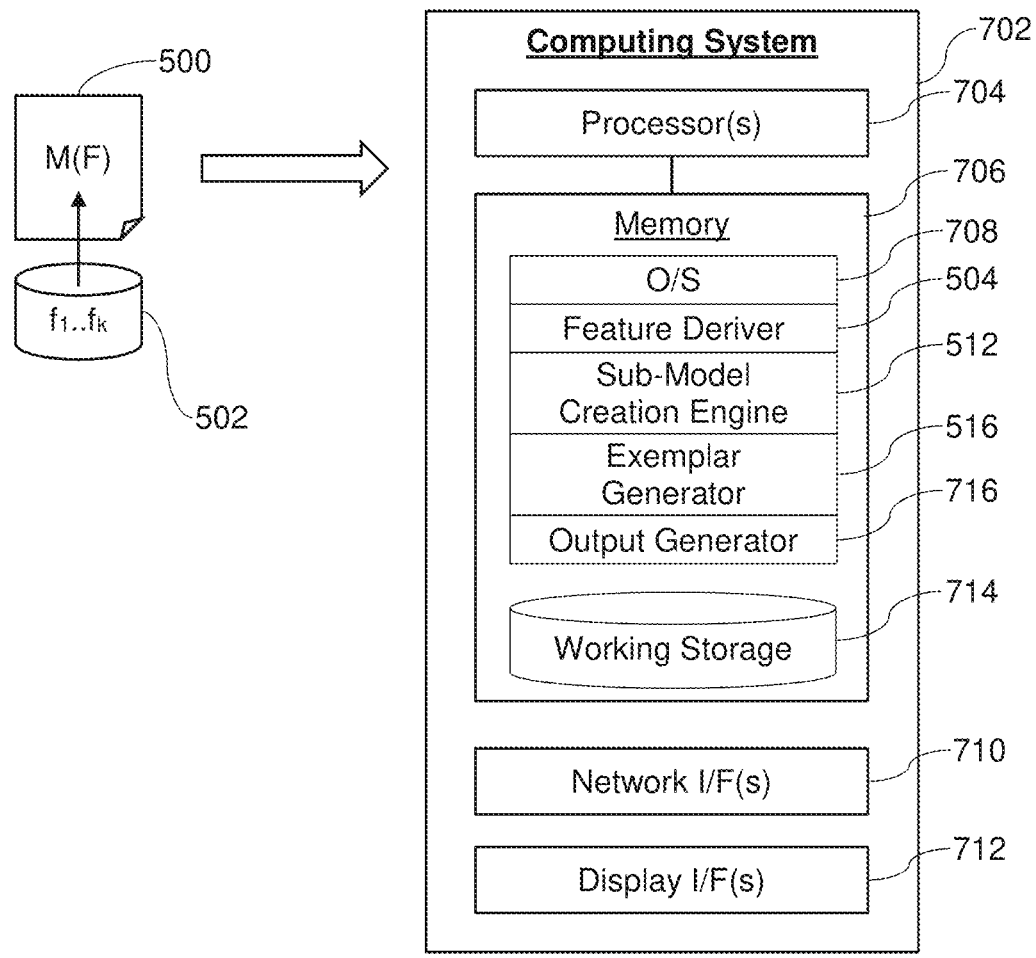
FIG. 7 is a block diagram showing example computer system components that may be used to implement the approach shown in and described in connection with FIGS. 5-6.

FIG. 7 is a block diagram showing example computer system components that may be used to implement the approach shown in and described in connection with FIGS. 5-6. FIG. 7 shows a computing system 702 including processing resources such as, for example, at least one processor 704 operably coupled to a memory 706. The computing system further includes network interface(s) 710 and a display interface(s) 712. Each of these interfaces 710, 712 may include hardware input/output devices (e.g., a network card in the case of the network interface(s) 710), software Application Programming Interfaces (APIs) callable to make use of the hardware elements, and/or the like. The network interface(s) 710 may, for example, provide incoming and/or outgoing connections from/to a computer network such as, for example the Internet.

In certain example embodiments, a representation of the model 500 (with the model features 502) at least initially may be external to the computing system 702. For example, it may be stored to an external storage device and uploaded or otherwise made accessible to the computing system 702. An electronic interface making use of the network interface(s) 710 (such as, for example, a network upload, API and/or web service calls, etc.) may enable the computing system 702 to access or otherwise interact with the model 500 and the model features 502.

The memory 706 in the computing system 702 includes volatile and/or non-volatile storage. As shown in the FIG. 7 example, the memory 706 stores an operating system 708, along with software modules suitable for implementing the functionality described above in connection with FIG. 5. For instance, in certain example embodiments, software modules are stored in the memory and enable the processor(s) 704 to perform functionality needed for the execution of the feature deriver 504, sub-model creation engine 512, exemplar generator 516, etc. Working storage may be used to buffer or otherwise store user input 506 and/or projections 508 usable by the feature deriver 504; output from the modules executed under control of the processor(s) 704 such as, for example, the features 510 determined to be strongly correlated with performance of the model 500, the aggregate tessellation 514, prototype exemplars for each created sub-model, output metrics 518, etc.; and/or other data useful for operation of the overall system. The output generator module 716 provides the display, comparison, suggestions, etc. 520, described above. It may make use of the network interface(s) 710 to generate results to be displayed on a remote display (e.g., if the computing system is a server and is accessed by a remote client computing device), the display interface(s) 712 to output results to a local display device, local storage where results may be cached, etc.

In view of the foregoing description, it will be appreciated that the processing resources (including the processor(s) 704 and the memory 706) of the computing system 702 may be configured to control the computing system 702 to perform functionality such as that described above in connection with FIGS. 5-6. The computing system 702 itself may including one or more computers (e.g., a server or series of servers) or it may be a standalone machine. In certain example embodiments, the model 500 may be collocated with the computing system 702 initially, or the model 500 may be provided or otherwise made accessible to the computing system 702. Results may be output locally and/or provided to a remote user accessing a program implemented over the Internet, for example.

Figure 8:
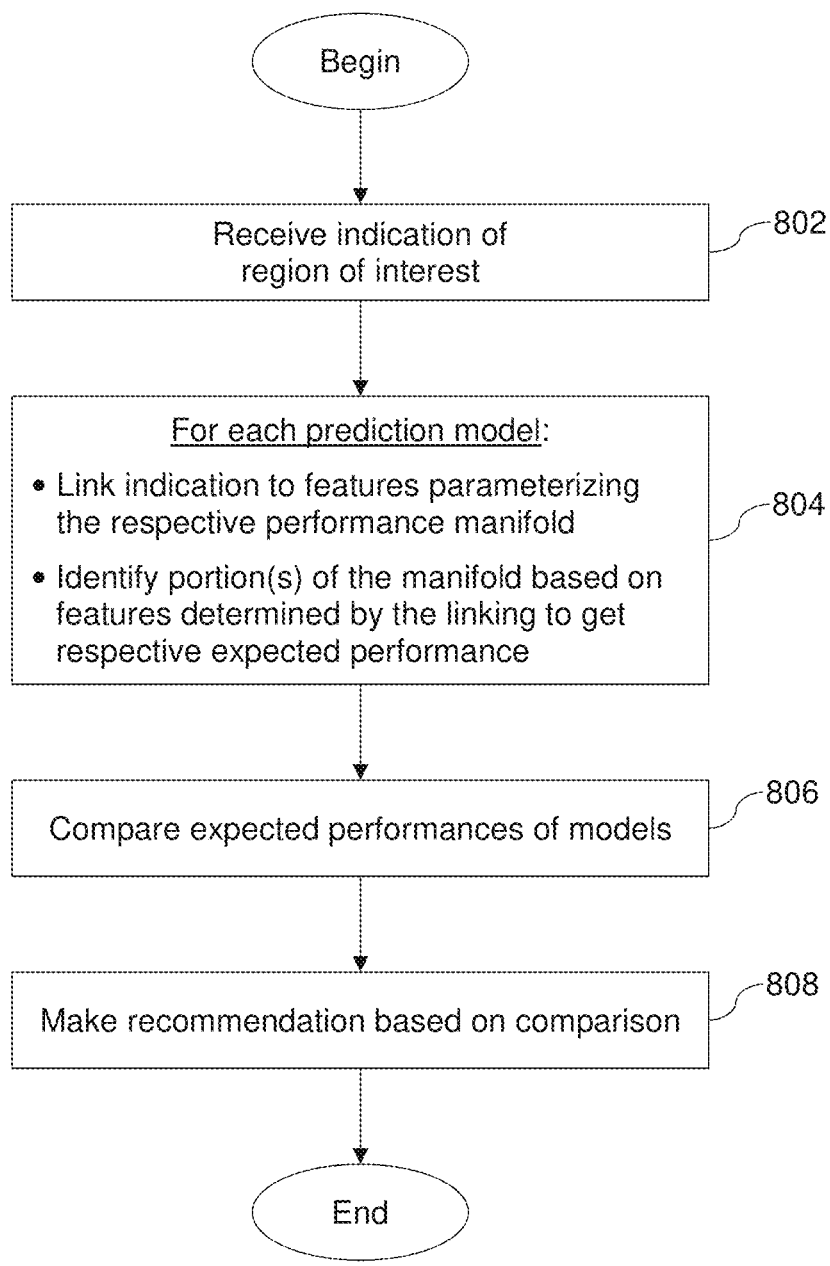
FIG. 8 is a flowchart showing an approach for recommending a prediction model, in accordance with certain example embodiments.

FIG. 8 is a flowchart showing an approach for recommending a prediction model, in accordance with certain example embodiments. It will be appreciated that the same or similar architecture as that shown in and described above in connection with FIG. 7 may be used to execute the functionality of that described in connection with FIG. 8. The model is recommended from among a plurality of different prediction models, with each one of the different prediction models having been trained based on a respective training data set and performing in accordance with a respective theoretical performance manifold. In some cases, each of the different prediction models may be trained based on a different training data set. The models may be received over an electronic interface (including, for example, a hardware network interface, using API calls, web service calls, etc.) if they are remote from the computing system, etc., as described above.

In step 802, an indication of a region definable in relation to the theoretical performance manifolds of the different prediction models is received as input. The indication of the region may be defined as a set of one or more attributes that parameterize at least one of the different models, using a plurality of images, etc. User input may be provided locally or from a remote source (e.g., via a web application, over the internet, using a standalone application operating under control of the processing resources, etc.). In step 804, for each of the different prediction models, the indication of the region is linked to features parameterizing the respective performance manifold, and one or more portions of the respective performance manifold is identified based on the features determined by the linking. The one or more portions have a volume and a shape that collectively denote an expected performance of the respective model for the input.

In certain example embodiments, for each of the different prediction models, a representation of the respective performance manifold may be generated, and the linking and the identifying may be practiced in connection with the representations of the performance manifolds of the respective prediction models. The generating of the representations of the performance manifolds may comprise, for each of the different prediction models: determining which of the plurality of features parameterizing the respective model are strongly correlated with performance of the respective model (see example techniques disclosed above); based on the features determined to be strongly correlated with performance of the respective model, creating a plurality of parameterized sub-models that, in aggregate, approximate the performance manifold; and defining the representation of the respective model as the aggregation of the sub-models.

In some cases, generating of the representations may be performed prior to reception of the input. Certain example embodiments may further include, for each of the different prediction models, generating prototype exemplars for each of the created sub-models, with the prototype exemplars for each created sub-model being objects to which the respective model can be applied to result in a match with the respective sub-model, and with the prototype exemplars characterizing the volume and/or shape for an estimated portion of the performance manifold. The techniques described above may be used in these regards. For instance, the software modules shown in and described in connection with FIG. 7 may be used in certain example embodiments.

The expected performance of the different prediction models are compared for the input, in step 806. Based on the comparison, one or more of the different prediction models is recommended in step 808. The expected performance of the models may in some instances reflect accuracy of identifying an object of a given type from new and/or unseen images.

In certain example embodiments, similar to as noted above, the objects may be images and/or image collections, with those objects potentially being parameterized explicitly on the features. In some instances, the training data sets and/or the input may include geospatial and/or geotemporal data such as, for example, satellite imagery. For example, the features parameterizing the performance manifolds include spatial extent, National Imagery Interpretability Rating Scale (NIIRS), off-nadir angle, signal-to-noise ratio (SNR), and/or cloud coverage values.

It will be appreciated that the techniques used herein may be used in connection with a variety of different models of a variety of different model types trained in connection with a variety of different training sets. Location of objects in geospatial and/or geotemporal images is just one example in this regard.

As noted above, certain example embodiments can be used to quantify the accuracy of a given model for a general or specific input space, e.g., such that statements can be made about the quality of a given model. It thus becomes possible to quantify the accuracy of models so that they can be rated and/or compared to one another using a common and understandable metric. The same or similar techniques can also be used to suggest a particular model or training data set of interest for a specific input space or area of interest. Points of failure in a model can also be identified using the technology disclosed herein, and the technology disclosed herein also can be used to help combat adversarial ML.

Based on the description provided above, it will be appreciated that certain example embodiments are technically advantageous in that they provide technology-based solutions to technology-based problems. For example, certain example embodiments provide technical solutions to technical problems associated with the general inability to objectively and reproducibly compare model performance across different models, a single model with an intractable input space, and/or the like. As another example, certain example embodiments provide technical solutions to technical problems associated with the difficulties in locating where innate "biases" in ML models and/or AI systems might lie, e.g., because of poorly trained models, intentionally manipulated training data sets, and/or the like.

In a similar vein, certain example embodiments provide technical improvements to current ML and AI related modeling tools. In that regard, certain example embodiments improve current ML and AI related tools by enabling objective quantification of model accuracy for models being or already produced, yielding expected performance data for a particular data set even when the input space potentially is unknown, facilitating model-to-model comparisons, etc. As an example, certain example embodiments improve current ML and AI related tools by enabling specific already-produced models to be suggested, and/or by suggesting how to produce models expected to perform well (e.g., by suggesting what models to use, what training data should be used, etc.). As still another example, certain example embodiments provide technical improvements to tools that incorporate models because it becomes possible to know which models to include when performing analyses or making suggestions, which data sets to train on, etc. This may lead to better performance (e.g., increased accuracy, reduced processing time, etc.) of the tools that incorporate such models because they can be expected to perform better based on their quantified performance metrics.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of quantifying accuracy of a prediction model that has been trained on a data set parameterized by a plurality of features, the model performing in accordance with a theoretical performance manifold over an intractable input space in connection with the features, the method comprising:
   determining which of the plurality of features are strongly correlated with performance of the model;
   based on the features determined to be strongly correlated with performance of the model, creating a plurality of parameterized sub-models that, in aggregate, approximate the intractable input space;
   generating prototype exemplars for each of the created sub-models, the prototype exemplars for each created sub-model being objects to which the model can be applied to result in a match with the respective sub-model; and
   quantifying the accuracy of the model using the generated prototype exemplars;
   wherein the quantifying of the accuracy of the model further comprises, provided that the prototype exemplars are representative of the intractable input space, approximating the expected performance of the model on a new data set as the sum of a set of one or more performance metrics for the model on each of the prototype exemplars multiplied by the probability of the respective prototype exemplar matching its respective sub-model.

2. The method of claim 1, wherein the model is trained to identify objects in images.

3. The method of claim 2, wherein the images are satellite images, and
wherein the features include spatial extent, National Imagery Interpretability Rating Scale (NIIRS), off-nadir angle, signal-to-noise ratio (SNR), and/or cloud coverage values.

4. The method of claim 2, wherein the quantified accuracy reflects the expected performance of the model identifying an object of a given type from new and/or unseen images.

5. The method of claim 1, wherein the quantifying of the accuracy of the model further comprises, provided that the prototype exemplars are representative of the intractable input space, approximating the variance of the model on the new data set as:
(a) the sum of a set of one or more performance metrics for the model on each of the prototype exemplars squared multiplied by the probability of the respective prototype exemplar matching its respective sub-model, subtracting (b) the square of the sum of the set of the one or more performance metrics for the model on each of the prototype exemplars, multiplied by the probability of the respective prototype exemplar matching its respective sub-model.

6. The method of claim 1, wherein the intractable input space represents all valid data sets to which the model can be applied.

7. The method of claim 1, further comprising determining which features are strongly correlated with performance of the model by receiving a user-specified list of one or more features and/or by running a residual network feature extractor.

8. The method of claim 1, wherein the parameterized sub-models are created in accordance with a predefined taxonomy and/or a data-driven approach to deriving the sub-models.

9. The method of claim 1, wherein the prototype exemplars are generated using synthetics.

10. The method of claim 1, further comprising limiting the intractable input space to a continuous region defined by the data set on which the prediction model is trained.

11. The method of claim 1, further comprising limiting the intractable input space to a plurality of discontinuous regions.

12. The method of claim 1, wherein the data set on which the prediction model is trained is for a first application, the accuracy of the model is quantified for a data set for a second application, and the first and second applications are different from one another.

13. The method of claim 1, wherein the data set on which the prediction model is trained is for a first geospatial and/or geotemporal image type, the accuracy of the model is quantified for a data set for a second geo spatial and/or geotemporal image type, and the first and second geospatial and/or geotemporal image types are different from one another.

14. A method of quantifying accuracy of a prediction model that has been trained on a data set parameterized by a plurality of features, the model performing in accordance with a theoretical performance manifold over an intractable input space in connection with the features, the method comprising:

determining which of the plurality of features are strongly correlated with performance of the model;
based on the features determined to be strongly correlated with performance of the model, creating a plurality of parameterized sub-models that, in aggregate, approximate the intractable input space;
generating prototype exemplars for each of the created sub-models, the prototype exemplars for each created sub-model being objects to which the model can be applied to result in a match with the respective sub-model; and
quantifying the accuracy of the model using the generated prototype exemplars;
wherein the quantifying of the accuracy of the model further comprises, provided that the prototype exemplars are completely parameterized by the features:
defining a set of one or more performance metrics for the model as a regression on the model for the prototype exemplars; and
(i) approximating the expected performance of the model on a new data set as the sum of the regression on each prototype exemplar multiplied by the probability of the respective prototype exemplar matching its respective sub-model; and/or (ii) approximating the variance of the model on the new data set as (a) the sum of the regression on each prototype exemplar squared multiplied by the probability of the respective prototype exemplar matching its respective sub-model, subtracting (b) the square of the sum of the regression on each prototype exemplar multiplied by the probability of the respective prototype exemplar matching its respective sub-model.

15. The method of claim 14, wherein the intractable input space represents all valid data sets to which the model can be applied.

16. The method of claim 14, further comprising limiting the intractable input space to a continuous region defined by the data set on which the prediction model is trained.

17. The method of claim 14, wherein the data set on which the prediction model is trained is for a first geospatial and/or geotemporal image type, the accuracy of the model is quantified for a data set for a second geo spatial and/or geotemporal image type, and the first and second geospatial and/or geotemporal image types are different from one another.

18. The method of claim 14, wherein the images are satellite images, and
wherein the quantified accuracy reflects the expected performance of the model identifying an object of a given type from new and/or unseen images.

19. A system for quantifying accuracy of a prediction model that has been trained on a data set parameterized by a plurality of features, the model performing in accordance with a theoretical performance manifold over an intractable input space in connection with the features, the system comprising:
an electronic interface over which the model is received; and
processing resources including at least one processor and a memory coupled thereto, the processing resources being configured to at least:
determine which of the plurality of features are strongly correlated with performance of the model;
based on the features determined to be strongly correlated with performance of the model, create a plurality of parameterized sub-models that, in aggregate, approximate the intractable input space;

generate prototype exemplars for each of the created sub-models, the prototype exemplars for each created sub-model being objects to which the model can be applied to result in a match with the respective sub-model; and quantify the accuracy of the model using the generated prototype exemplars;

wherein the quantifying of the accuracy of the model further comprises, provided that the prototype exemplars are representative of the intractable input space, approximating the expected performance of the model on a new data set as the sum of a set of one or more performance metrics for the model on each of the prototype exemplars multiplied by the probability of the respective prototype exemplar matching its respective sub-model.

20. The system of claim 19, wherein the model is trained to identify objects in images.

21. The system of claim 20, wherein the images are satellite images, and wherein the features include spatial extent, National Imagery Interpretability Rating Scale (NIIRS), off-nadir angle, signal-to-noise ratio (SNR), and/or cloud coverage values.

22. The system of claim 20, wherein the quantified accuracy reflects the expected performance of the model identifying an object of a given type from new and/or unseen images.

23. The system of claim 19, wherein the quantifying of the accuracy of the model further comprises, provided that the prototype exemplars are representative of the intractable input space, approximating the variance of the model on the new data set as:

(a) the sum of a set of one or more performance metrics for the model on each of the prototype exemplars squared multiplied by the probability of the respective prototype exemplar matching its respective sub-model, subtracting (b) the square of the sum of the set of the one or more performance metrics for the model on each of the prototype exemplars, multiplied by the probability of the respective prototype exemplar matching its respective sub-model.

24. The system of claim 19, wherein the quantifying of the accuracy of the model further comprises, provided that the prototype exemplars are completely parameterized by the features:

defining a set of one or more performance metrics for the model as a regression on the model for the prototype exemplars; and approximating the expected performance of the model on the new data set as the sum of the regression on each prototype exemplar multiplied by the probability of the respective prototype exemplar matching its respective sub-model.

25. The system of claim 19, wherein the quantifying of the accuracy of the model further comprises, provided that the prototype exemplars are completely parameterized by the features:

defining a set of one or more performance metrics for the model as a regression on the model for the prototype exemplars; and approximating the variance of the model on the new data set as:

(a) the sum of the regression on each prototype exemplar squared multiplied by the probability of the respective prototype exemplar matching its respective sub-model, subtracting (b) the square of the sum of the regression on each prototype exemplar multiplied by the probability of the respective prototype exemplar matching its respective sub-model.

26. The system of claim 19, wherein the intractable input space represents all valid data sets to which the model can be applied.

27. The system of claim 19, wherein the processing resources are further configured to at least determine which features are strongly correlated with performance of the model by receiving a user-specified list of one or more features and/or by running a residual network feature extractor.

28. The system of claim 19, wherein the parameterized sub-models are created in accordance with a predefined taxonomy and/or a data-driven approach to deriving the sub-models.

29. The system of claim 19, wherein the prototype exemplars are generated using synthetics.

30. The system of claim 19, wherein the objects are images and/or image collections, the objects being parameterized explicitly on the features.

31. The system of claim 19, wherein the processing resources are further configured to at least limit the intractable input space to either a continuous region defined by the data set on which the prediction model is trained, or a plurality of discontinuous regions.

32. The system of claim 19, wherein the data set on which the prediction model is trained is for a first application, the accuracy of the model is quantified for a data set for a second application, and the first and second applications are different from one another.

33. The system of claim 19, wherein the data set on which the prediction model is trained is for a first geospatial and/or geotemporal image type, the accuracy of the model is quantified for a data set for a second geo spatial and/or geotemporal image type, and the first and second geospatial and/or geotemporal image types are different from one another.

34. The system of claim 19, wherein at least one of the features determined to be strongly correlated with part of the model includes a non-linear mapping based on a feature from the data set on which the prediction model is trained.

35. The system of claim 34, wherein the non-linear mapping is kernel principal component analysis.

* * * * *